United States Patent [19]

Marks

[11] Patent Number: 5,117,356

[45] Date of Patent: May 26, 1992

[54] AUTOMATED LEDGER ACCOUNT MAINTENANCE SYSTEM

[75] Inventor: Ronald Marks, Philadelphia, Pa.

[73] Assignee: DNS, Inc., Philadelphia, Pa.

[21] Appl. No.: 387,134

[22] Filed: Jul. 28, 1989

[51] Int. Cl.$^5$ ............................................. G06F 15/30
[52] U.S. Cl. ................................................... 364/406
[58] Field of Search ........................................ 364/406

[56] References Cited

U.S. PATENT DOCUMENTS

| | | | |
|---|---|---|---|
| 3,749,892 | 7/1973 | Stenning | 364/406 |
| 4,642,767 | 2/1987 | Lerner | 364/406 |
| 4,843,548 | 6/1989 | Carpenter | 364/406 |

OTHER PUBLICATIONS

*Data Sources: 1st Edition 1990*, vol. 2, 1989, Computer Associates International, Inc. pp. J-3 to J-63.
*Is Real Time Software Ahead of Time?*, Steve Cowherd, Accounting Today, Systems Management, Dec. 14, 1987.
*Numbers Gain New Meaning*, Shawn Bryan, Accounting and Financial Systems, Computerworld, Jul. 20, 1987.

*Primary Examiner*—Dale M. Shaw
*Assistant Examiner*—David Huntley
*Attorney, Agent, or Firm*—Dann, Dorfman, Herrell and Skillman

[57] ABSTRACT

An automated ledger account maintenance system provides up-to-the-minute balances in all ledger accounts whenever data relating to a completed transaction is entered. The system is implemented on a general purpose computer and includes a predefined data file structure including ledger account data files corresponding to the ledger accounts and transaction record data files corresponding to transaction journals. Compliance with user definable accounting procedures is ensured through the use of an accounting control table that contains symbolic codes used by the recordkeeping procedures to authorize and control the creation and updating of the ledger account and transaction record data files. Cross-referencing and indexing of ledger account records, transaction records, and the second control records is provided to ensure a high degree of resistance to unauthorized alteration of the data files and to provide for traceability of all entries and postings.

17 Claims, 3 Drawing Sheets

| GL1 | GL2 | GL3 | GL4 | GL5 | GL6 | GL7 |
|-----|-----|-----|-----|-----|-----|-----|
| GR1 | $$$ | DEP | DR  | PRI | NUM | NAME |
| GR2 | .   | .   | .   | .   | .   | .   |
| GR3 | .   | .   | .   | .   | .   | .   |

FIG. 2

| OL1 | OL2 | OL3 | OL4 | OL5 | OL6 | OL7 | OL8 |
|-----|-----|-----|-----|-----|-----|-----|-----|
| OR1 | $$$ | C   | DR  | PRI | GRI | NUM | NAME |
| OR2 | .   | .   | .   | .   | .   | .   | .   |

FIG. 3

| DL1 | DL2 | DL3 | DL4 | DL5 | DL6 | DL7 | DL8 |
|-----|-----|-----|-----|-----|-----|-----|-----|
| DR1 | $$$ | DEP | DR  | PRI | GRI | NUM | NAME |
| DR2 | .   | .   | .   | .   | .   | .   | .   |
| DR3 | .   | .   | .   | .   | .   | .   | .   |

FIG. 4

| TT1 | TT2 | TT3 | TT4 | TT5 | TT6 | TT7 | TT8 | TT9 | TT10 | TT11 |
|-----|-----|-----|-----|-----|-----|-----|-----|-----|------|------|
| TR1 | $$$ | DEP | DR  | GRI | ORI | DRI | ADATE | PDATE | RL | R1234 |
| TR2 | .   | .   | .   | .   | .   | .   | .   | .   | .    | .    |
| TR3 | .   | .   | .   | .   | .   | .   | .   | .   | .    | .    |

| PT1 | PT2 | PT3 | PT4 | PT5 | PT6 | PT7 | PT8 | PT9 | PT10 | PT11 | PT12 | PT13 | PT14 |
|---|---|---|---|---|---|---|---|---|---|---|---|---|---|
| PR1 | $$$ | DEP | DR | GRI | ORI | DRI | GRI | ORI | DRI | ADATE | PDATE | RL | RLI234 |
| PR2 | . | . | . | . | . | . | . | . | . | . | . | . | . |
| PR3 | . | . | . | . | . | . | . | . | . | . | . | . | . |

FIG. 7

| AC1 | AC2 | AC3 | AC4 | AC5 | AC6 | AC7 |
|---|---|---|---|---|---|---|
| AR1 | DEPOSITS | DEP | DP | RL | DTP | C |
| AR2 | . | . | . | . | . | . |
| AR3 | . | . | . | . | . | . |

FIG. 8

| EC1 | EC2 | EC3 |
|---|---|---|
| FR1 | CONT GEN LEDG | GRI |
| FR2 | OBL DUE LEDG | ORI |
| . | . | . |
| FR5 | TEMPTRANS | |

AUTOMATED LEDGER ACCOUNT MAINTENANCE SYSTEM

This application includes a microfiche appendix containing a computer program listing. The microfiche appendix consists of 20 microfiche containing a total 4141 frames.

FIELD OF THE INVENTION

This invention relates to automated recordkeeping and accounting systems and in particular to such a system that provides current balances of all ledger accounts of a recordkeeping entity whenever data relating to an accountable transaction is entered and posted by the system.

BACKGROUND OF THE INVENTION

Previously, in order to obtain account balances from the ledgers in a double-entry recordkeeping (i.e., bookkeeping) system, it was necessary to manually enter accountable transactions in one or more journals, manually post the accountable transactions to corresponding accounts in the general and subsidiary ledgers of the system, and then manually balance the accounts in the ledgers.

The term "trial balance" applies to a list or abstract of money amounts and their totals, or of the debit balances and credit balances of all accounts in a particular ledger. The trial balances are used for accounting control in the double-entry recordkeeping process and provide useful information concerning the financial state of the recordkeeping entity, such as a business, professional office, government agency, etc., whose accounts are being maintained.

The manual procedure for maintaining the bookkeeping records generally follows a well-known sequence. First, the debit and credit amounts relating to accountable transactions are entered in the journals by recording those amounts in the appropriate debit and credit columns of the journals. The money amounts recorded in each column for all entries within a given accounting period are summed at the end of such period. If each original entry was correctly balanced, that is debit equals credit, and the money amounts correctly summed for each debit and credit column, then the total money amounts of the debit columns should sum to the totalled money amounts of the credit columns.

The correctly balanced money amounts from the journals must then be posted to the respective accounts in the ledgers of the bookkeeping system. Each individual ledger account has a summary balance which provides either a debit balance or a credit balance for that account up to the date of posting.

The generally accepted practice is to record original entries in the journal and then post entries to the ledger accounts in ink in order to make any subsequent alterations visibly apparent to those involved in maintaining the bookkeeping system. Furthermore, because the ledger accounts are only posted periodically the trial balances are usually obtained at infrequent intervals corresponding to the particular accounting period, such as the end of the month.

Computer based accounting systems have been developed in an effort to speed up the accounting process for recordkeeping entities having a large number of accountable transactions, as well as a large number of ledger accounts which must be maintained. Unlike manual bookkeeping systems in which individual accounts are marginlined in ink so that changes or revisions can only be effected through the posting of correcting entries, computer systems introduce the possibility of computer records being altered or erased or deleted without any indication of a separate, correction entry. This has created a number of serious accounting, auditing, and reporting problems, such as detection of unauthorized changes to the data recorded in the computer records, unauthorized deletion of valid records, and unauthorized insertion of accounting records.

In an attempt to solve the problems associated with computer based accounting systems, elaborate and expensive programming schemes have been devised. Some of those schemes require production of large volumes of paper output formatted to simulate the traditional journals and ledgers. The drawback to such an approach is that the simulated journals and ledgers are produced after the fact and may not provide any indication of changes to or deletions from the computer's records. Other schemes are so complex they require the average accountant or auditor to rely on a computer specialist for assistance in understanding how the computer system works.

SUMMARY OF THE INVENTION

The aforementioned problems associated with known accounting and record keeping systems, both manual and automated, are solved to a large degree by the automated ledger account maintenance system according to the present invention, wherein current account balances can be obtained on demand whenever a completed transaction set is entered and posted by the system. The system according to the present invention includes a computer program composed of procedures for performing various account recordkeeping tasks, for example, the recording of cash disbursements such as checks or electronic funds transfer, the recording of payroll disbursements such as payroll checks, or the recording of receivable or payable transactions such as invoices or vouchers. The recordkeeping procedures of the computer program perform their various functions in accordance with certain system accounting controls that are definable by the recordkeeping entity whose accounts are dynamically maintained by the system. The accounting controls are assembled in an accounting controls file that stores a plurality of accounting control records. Each control record contains one or more symbolic codes associated with each recordkeeping procedure. The symbolic codes are used by the recordkeeping procedures to determine such rules as how new records are to be created, whether the recordkeeping procedure can properly access a requested data file, whether a money amount is to be posted as a debit or a credit, whether there is a balanced transaction record set for updating the ledger account records, and other rules for ledger account maintenance.

The system includes at least one ledger account data file for storing one or more ledger account records. Each dynamically creatable account record defines a ledger account of the entity whose books are maintained by the system. An account record includes such data as a money balance, a debit/credit descriptor for the account record, and indicia for identifying the account.

A transaction data file, corresponding to the journal records, is provided for storing each transaction record which relates to an accountable transaction affecting one of the entity's ledger accounts. A transaction record includes such data as a money amount, a debit/credit descriptor for said money amount, and a symbolic authorization code.

A file control table is preferably included in the system and stores indicia that identify the last-used record in each of the system data files.

The recordkeeping procedures perform their respective functions by receiving data from a user, and then utilizing that data to create a permanent record in the transaction data file of the accountable transaction to which the data is related. Upon assembling a balanced transaction record set and contemporaneously generating a document, the system updates the appropriate ledger account records. Here and throughout this application the term document includes a document in any man or machine readable form that is generated to authorize or acknowledge an accountable transaction; and includes, but is not limited to paper documents, such as checks, invoices and the like, electronic information transfers, and magnetic or optically recorded documents.

The system preferably has output means for providing indicia, for example printed reports, of the money balance or balances in one or more of the ledger accounts as stored in the ledger account data file. When so equipped, the system is readily recognizable to an accountant or auditor as an accounting system for performing double-entry recordkeeping tasks and providing information concerning the ledger accounts of the entity whose accounts are maintained with the system.

BRIEF DESCRIPTION OF THE DRAWINGS

The foregoing summary, as well as the following detailed description of a preferred embodiment of the present invention, will be better understood when read in connection with the appended drawings, wherein:

FIG. 2 is a representation of the data structure of the control general ledger data file 22 of FIG. 1;

FIG. 3 is a representation of the data structure of the obligation due subsidiary ledger data file 24 of FIG. 1;

FIG. 4 is a representation of the data structure of the discretionary subsidiary ledger data file 26 of FIG. 1;

FIG. 5 is a representation of the data structure of the temporary transactions journal data file 28 of FIG. 1;

FIG. 6 is a representation of the data structure of the permanent transactions journal data file 30 of FIG. 1;

FIG. 7 is a representation of the data structure of the accounting controls table 32 of FIG. 1; and FIG. 8 is a representation of the data structure of the file control table 34 of FIG. 1.

DETAILED DESCRIPTION

Figure 1:
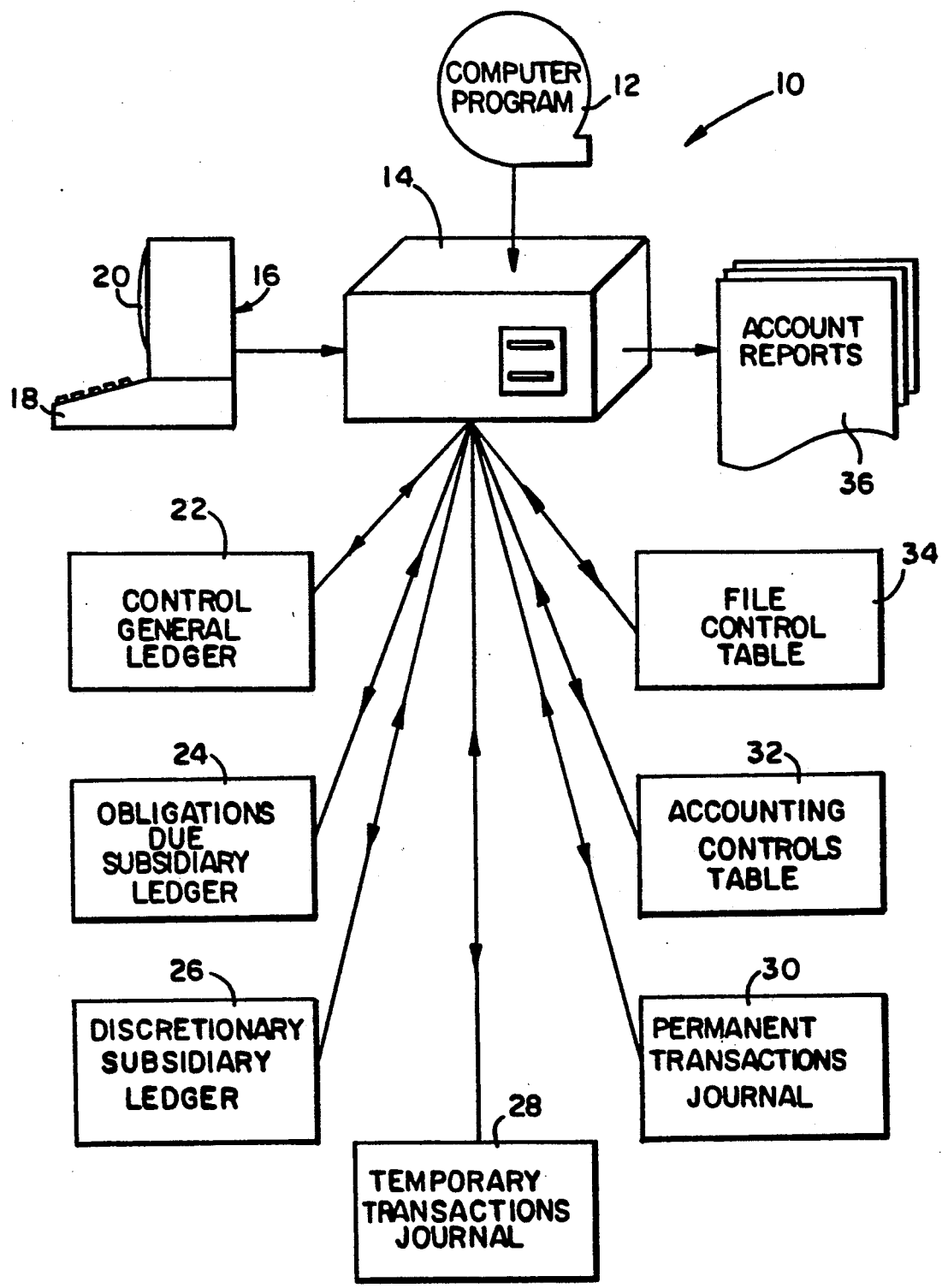
FIG. 1 is a schematic diagram of a system embodying the present invention.

The system according to the present invention is a computer implemented recordkeeping system for use in connection with a double-entry bookkeeping or accounting system. The system is preferably embodied in a properly programmed personal computer for use by an individual or small business, but is comprehensive and expandable such that it can be implemented on a main frame computer for use by very large entities.

A system embodying the present invention includes a structured set of data files, an accounting control table and a file control index table, and a computer program that includes procedures for recognizing and temporarily recording accountable activities into one of the data files, procedures for entering, posting and updating the permanent data files when a balanced set of activity records has been assembled, procedures for creating new and updating existing records in the temporary and permanent transaction data files, and cross-reference indexing of the data files as a means of control.

Referring to FIG. 1 of the drawings, there is shown a preferred embodiment of the ledger account maintenance system according to the present invention. A computer program 12 for implementing the steps of the various recordkeeping procedures performed by the system is programmed into a computer 14. The computer program 12 may be recorded on a suitable storage device, for example, magnetic tape or diskette, or can be resident on a hard disk in the computer 14. Transaction data input means, such as a computer terminal 16, including a keyboard 18 and video display terminal 20, is connected to the computer 14. In the preferred embodiment of the present invention the computer program 12 has an input module for obtaining accounting data from a user in an interactive manner, for example by displaying appropriate questions in text on the video display terminal 20 so that the user can key-in the requested information by means of the keyboard 18. It is also contemplated that accounting data can be input to the computer 14 by means of prerecorded machine readable media or by direct input means such as electronic transfer.

The data that is recorded, updated, and used by the computer program 12 is stored in five interrelated, interdependent data files, namely a control general ledger file 22; two subsidiary ledger files, a obligation due subsidiary ledger file 24 and a discretionary subsidiary ledger file 26; a temporary transaction records file 28; and the permanent transaction records file 30. The data files are preferably stored on directly accessible media so that they are readily accessed by the computer program 12. Of course, the data files can be stored off-line such as on tape or diskette if desired.

As will be described more fully hereinbelow, the control general ledger file 22 contains one account record for each active ledger account, e.g., accounts payable, accounts receivable, accrued payroll, etc., of the entity whose books are being maintained by the system. The obligation due subsidiary ledger file 24 contains an account record for each customer, supplier, employee, or other legally definable entity to or from whom money is or may be owed. Each account record stored in the obligation due subsidiary ledger file constitutes a listing of an incurred obligation for payment of money in return for the receipt of goods or services. The discretionary subsidiary ledger file 26 contains one or more account records corresponding to user defined discretionary accounts. Discretionary accounts are used to provide greater precision or definition of the general ledger accounts recorded in the control general ledger file 22. For example, a discretionary ledger account record could be defined for each telephone number encompassed by telephone expense account record in the control general ledger file. Each of the account records in the obligation due subsidiary ledger file 24 and the discretionary subsidiary ledger file 26 must correspond to an account record in the control general ledger file 22.

FIG. 2 is a representation of a control general ledger data file 22 for use in the system according to the present invention. The control general ledger file 22 includes seven data fields, GL1–GL7, for each account record stored therein. In field GL1 is stored a record label which uniquely identifies each account record within the control general ledger file. In practice the record label is an integer or a combination of alphanumeric characters. Field GL2 stores a money amount which represents the money balance of the ledger account corresponding to the account record. Field GL3 stores a transaction posting authorization code which designates the type of data in the record and controls how the money balance in field GL2 can be updated and by what recordkeeping procedures it can be updated. As will be described more fully hereinbelow, a recordkeeping job is a procedure defined in the computer program 12 for reading data from and/or writing data to one or more data files in a manner consistent with accounting rules defined in the accounting control table 32. A debit/credit descriptor is stored in field GL4 and provides an indication of whether the money balance in field GL2 is expected to be a debit balance, a credit balance, or zero. Field GL5 stores a record pointer which is the record label from the permanent transaction records file 30 of the last permanent transaction record from which the money balance in field GL2 was updated. In other words, the datum in field GL5 points to the last transaction which resulted in a change in the money balance stored in the account record. A user defined, unique account code is stored in field GL6 and the corresponding account name is stored in field GL7.

FIGS. 3 and 4 are representations of the data fields of the obligation due subsidiary ledger file 24 and the discretionary subsidiary ledger file 26. Each of these ledger files includes eight data fields, OL1-OL8 and DL1-DL8 respectively, for each account record stored therein. In most cases the data fields are similar to those for the control general ledger file 22 described above. Record labels which uniquely identify each account record in each file are stored in fields OL1 and DL1 respectively. Fields OL2 and DL2 store money amounts which represent the money balances of the ledger accounts corresponding to the account records identified in OL1 and DL1. Field OL3 stores a legal entity type code that characterizes the nature of the entity with whom an obligation may be or has been incurred. Field DL3 stores symbolic code of the same type as contained in field GL3 of the control general ledger record to which the subsidiary ledger account record identified in DL1 belongs. Debit/credit descriptors are stored in fields OL4 and DL4 and provide an indication of whether the money balances in fields OL2 and DL2, respectively, are expected to be debit, credit, or zero balances. Fields OL5 and DL5 store the record pointers to the transaction records from the permanent transaction records file 30 which were last used to update the money balances stored in fields OL2 and/or DL2. In fields OL6 and DL6 are stored the record pointers to the account record in the control general ledger file 22 to which the account records identified in OL1 and DL1 belong. The record pointers in fields OL6 and DL6 are cross-references between the obligation due subsidiary ledger file records and the discretionary subsidiary ledger file records on the one hand, and the control general ledger file records on the other. The account records corresponding to the pointers stored in fields OL6 and/or DL6 are always updated when the respective records identified in fields OL1 and/or DL1 are updated. Unique user defined account codes identifying the respective obligation due and discretionary subsidiary ledger accounts of the recordkeeping entity are stored in fields OL7 and DL7, and the corresponding account names are stored in fields OL8 and DL8.

The ledger account data files described above correspond to the ledgers of a recordkeeping entity, i.e., the books of final entry. In order to provide traceability, however, the system also includes transaction record files that correspond to the journals of the recordkeeping entity, i.e., the books of original entry. The transactions records files utilized in the system according to the present invention include the temporary transactions record file 28 and the permanent transactions record file 30.

The temporary transactions journal data file 28 contains transaction records of economic activities which have not been entered as permanent transaction records and have not been posted to the control general ledger file and to the relevant subsidiary ledger files. The temporary transaction records stored in the temporary transactions journal file 28 are representatively illustrated in FIG. 5, and include eleven data fields, TT1-TT11. In field TT1 is stored a record label uniquely identifying a transaction record within the temporary transactions journal file 28. In field TT2 is stored the money amount involved in the real world activity to which the transaction record corresponds. Field TT3 stores a symbolic transaction posting authorization code which characterizes the accounting nature of the economic activity to which the transaction record corresponds and how the money amount in the transaction record is to be applied to update the appropriate ledger account when the transaction is posted. Field TT4 stores a debit/credit identifier which qualifies the money amount in field TT2 as a debit amount or as a credit amount. Fields TT5, TT6, and TT7 store record labels from the control general ledger file 22, the obligation due subsidiary ledger file 24, and the discretionary subsidiary ledger file 26 which may be updated by the transaction record identified in field TT1. In field TT8 is stored the actual date of the activity recorded in the temporary transaction record, for example, the date work is performed, the date merchandise is shipped, the date the check becomes negotiable, etc. In field TT9 is stored the date when the ledger records in fields TT5, TT6, and TT7 were posted and updated by the system according to the present invention. This posting date is generated by the system whenever a balanced transaction record set is entered in the permanent transactions journal data file 30 and the money amounts are posted to the designated ledger account records. The transaction record set will be defined more particularly herein below. Field TT10 stores a document code. The document code identifies to the system the type of transaction document that authorized or completed the transaction to which the transaction record relates. Listed in Table I below are some examples of preferred document codes used in the system according to this invention.

TABLE I

| | |
|---|---|
| DL - | Disbursement Document (e.g., a check) |
| PL - | Payroll Disbursement Document (e.g., a payroll check) |
| RL - | Receipts Deposited Document (e.g., bank deposit slip) |
| IL - | Invoice |
| VL - | Voucher |
| EL - | Employee Voucher |

TABLE I-continued

AL - Adjustment Document (e.g., a document relating to depreciation)

Field TT11 stores a document number identifying the particular document which effected completion of the accounting transaction corresponding to the transaction record in field TT1.

The permanent transactions journal data file 30 contains balanced accounting transaction record sets which have been entered and posted by the system. The permanent transactions journal file 30 includes fourteen data fields, PT1-PT14 and is representatively illustrated in FIG. 6. In field PT1 is stored a record label that uniquely identifies a transaction record within the permanent transaction records file 30. The money amount involved in the actual activity corresponding to the transaction record identified in field PT1 is stored in field PT2. Field PT3 stores the symbolic code from field TT3 of the temporary transaction record used to create the permanent transaction record identified in field PT1. In field PT4 is stored a debit/credit descriptor which qualifies the money amount stored in field PT2. Fields PT5, PT6, and PT7 store ledger record pointers to respective account records in the control general ledger and the two subsidiary ledger files which account records were updated from the transaction record identified in field PT1. Fields PT8, PT9, and PT10 store permanent transaction record pointers to the next preceding permanent transaction record having the identical ledger account record pointer stored respectively in fields PT5, PT6, and PT7 thereof. The data stored in fields PT8, PT9, and PT10 indicate the last permanent transaction record that was used to update the ledger account records identified by the pointers in fields PT5, PT6, and PT7 respectively. The actual date of the activity being recorded in the transaction record is stored in field PT11. In field PT12 is stored the posting date, that is, the date on which the data and the account records in fields PT5, PT6, and PT7 were posted and updated. Field PT13 stores the document code, and field PT14 stores the document number of the document which triggered the entry of the record identified in field PT1.

In order to ensure, and if necessary, verify that accounting transaction data is properly entered and posted by the system, an accounting controls table 32 as shown in FIG. 1 is utilized by the computer program 12. The accounting controls table 32 stores a plurality of symbolic control records corresponding to the recordkeeping procedures defined for the entity whose records are being maintained by the system. The recordkeeping procedures or jobs are program modules included in the computer program 12. The recordkeeping jobs are designed to create, access, and/or update the five data files 22, 24, 26, 28, and 30 in accordance with double-entry accounting methods. An example of a recordkeeping procedure is the Disbursements procedure which gathers data from and writes data to the various data files in order to enter and post a disbursement of cash, for example, to a supplier of goods or services. Another example is the Deposits procedure which gathers data from and writes data to the data files for entering and posting a deposit of cash into a bank account.

A feature of the system of the present invention is the use of symbolic codes which are stored in each accounting control record. As described more fully hereinbelow, the symbolic codes are used to ensure that the transaction data is properly entered by the system and properly posted to a proper ledger account record as a debit or a credit. It is not necessary that the computer program 12 that implements the system contain any accounting rules to properly maintain a double-entry bookkeeping system. It is necessary, however, that the posting process of the recordkeeping procedure requested by the user provide indicia which matches with at least one of the control records in the accounting controls table 32.

As shown in FIG. 7 the accounting controls table stores a list of predefined recordkeeping jobs or procedures which are authorized for transferring data to and among the data and control files to create a balanced transaction record consisting of at least two entries in the permanent transactions journal file 30 and corresponding postings to one or more of the ledger data files 22, 24 and 26. The accounting controls table is preferably stored in write protected storage, such as a read only memory (ROM). FIG. 7 is a representation of the data structure of the accounting controls table 32 that illustrates the data contained in the fields of the control records of that file. In the field identified as AC1 a unique record label is stored to identify each control record within the accounting control table. The name of a predefined recordkeeping procedure which is authorized to use the recordkeeping rules define by the control record identified in field AC1 is stored in field AC2. In field AC3 is stored a first symbolic code, the transaction posting authorization code, that is associated with the recordkeeping procedure whose name is stored in field AC2. The transaction posting authorization code is a symbolic code which indicates to the computer program the type of account that a recordkeeping procedure can legally create or update and which verifies how that account is to be updated (i.e., posted) when a transaction money amount is applied. For example, the Disbursements job can legally access a supplier type entity record in the obligation due subsidiary ledger file 24 or a PAY type record in either the control general ledger file 22 or the discretionary subsidiary ledger file 26.

Continuing with the description of the record fields in the accounting control table, field AC4 stores a debit/credit identifier or descriptor. The debit/credit identifier is a second symbolic code that, as previously explained, qualifies the expected balance in one of the ledger account records or qualifies the money amount in a transaction record. In field AC5 of some of the control records, there is stored a document code. The document code is a third symbolic code that corresponds to the document type codes discussed above. The document code thus relates a set of economic activity records to an economic event (i.e., a purchase, a sale) constituting the accountable transaction corresponding to the accountable condition or accountable event being recorded. A document code is not required to create a new ledger account record. The recordkeeping procedure requested by the user determines that it is time to post a balanced set of entries to the ledger account data files when a document code is present in a temporary transaction record.

Field AC6 of some of the accounting control table records stores a second or contrast code which symbolically identifies for the computer program the other type of transaction record which is used to update a ledger account based on the balancing activity in a transaction record set. Field AC7 of some of the accounting control records stores a legal entity type code which is a fourth symbolic code for characterizing the nature of the entity associated with a record in the obligation due subsidiary ledger record. The legal entity type code is associated with a particular recordkeeping procedure definable for a given entity. Thus, for example, a Receivables procedure is legal only for an account having entity type code C and a Payables procedure is legal only for an account having an entity type code S. As described above, the data fields in each control record in the accounting control table 32 contain the symbolic codes used by the computer program 12 for implementing the recordkeeping jobs or procedures performed by the system. The recordkeeping jobs or procedures include generally the creation, accessing, and updating of the five data files 22, 24, 26, 28, and 30. Examples of preferred symbolic codes are listed in Table II below as they would be stored in the accounting control table 32. In the preferred embodiment of the system according to the present invention, control records AR1 to AR7 of Table II are used to control the creation of new account records in the obligations due subsidiary ledger file 24, control records AR10-AR32 are used to control the creation of new account records in the control general ledger file 22 and the discretionary subsidiary ledger file 26. Control records AR40-AR62 are used to control the updating of account records in all of the ledger files 22, 24, and 26.

TABLE II

| AC1 | AC2 | AC3 | AC4 | AC5 | AC6 | AC7 |
|---|---|---|---|---|---|---|
| AR1 | DEPOSITS | — | DR | — | — | C |
| AR2 | RECEIVABLES | — | DR | — | — | C |
| AR3 | DISBURSEMENTS | — | CR | — | — | S |
| AR4 | PAYABLES | — | CR | — | — | S |
| AR5 | PAYROLL | — | CR | — | — | E |
| AR6 | PAYMENTS | — | Zero | — | — | S |
| AR7 | ADJUSTMENTS | — | Zero | — | — | X |
| — | — | — | — | — | — | — |
| — | — | — | — | — | — | — |
| AR10 | DEPOSITS | DEP | DR | — | — | — |
| AR11 | DEPOSITS | INP | DR | — | — | — |
| AR12 | RECEIVABLES | INP | DR | — | — | — |
| AR13 | RECEIVABLES | REC | CR | — | — | — |
| AR14 | RECEIVABLES | EXC | DR | — | — | — |
| AR15 | DISBURSEMENTS | DEP | DR | — | — | — |
| AR16 | DISBURSEMENTS | VRP | CR | — | — | — |
| AR17 | PAYABLES | VRP | CR | — | — | — |
| AR18 | PAYABLES | PAY | DR | — | — | — |
| AR19 | PAYABLES | EXC | DR | — | — | — |
| AR20 | PAYROLL | DEP | DR | — | — | — |
| AR21 | PAYROLL | EVP | CR | — | — | — |
| AR22 | PAYROLL | PYR | CR | — | — | — |
| AR23 | PAYROLL | EXC | DR | — | — | — |
| AR24 | EARNINGS | ERN | DR | — | — | — |
| AR25 | EARNINGS | EVP | CR | — | — | — |
| AR26 | PAYMENTS | DEP | DR | — | — | — |
| AR27 | PAYMENTS | PAY | DR | — | — | — |
| AR28 | PAYMENTS | EXC | DR | — | — | — |
| AR29 | ADJUSTMENTS | P&L | CR | — | — | — |
| AR30 | ADJUSTMENTS | PLA | DR | — | — | — |
| AR31 | ADJUSTMENTS | PLA | CR | — | — | — |
| AR32 | COST OF SALES | COS | DR | — | — | — |
| — | | | | | | |
| — | | | | | | |
| — | | | | | | |
| — | | | | | | |
| — | | | | | | |
| — | | | | | | |
| AR40 | DEPOSITS | DEP | DR | — | DTP | C |
| AR41 | DEPOSITS | DTP | CR | RL | DEP | C |
| AR42 | RECEIVABLES | INP | DR | IL | REC | C |
| AR43 | RECEIVABLES | REC | CR | — | INP | C |
| AR44 | RECEIVABLES | ITP | CR | — | INP | C |
| AR45 | RECEIVABLES | INP | DR | IL | ITP | C |
| AR46 | PAYABLES | VRP | CR | VL | PAY | S |
| AR47 | PAYABLES | PAY | DR | — | VRP | S |
| AR48 | PAYABLES | VTP | DR | — | VRP | S |
| AR49 | PAYABLES | VRP | CR | VL | VTP | S |
| AR50 | PAYROLL | PYR | DR | — | PCP | E |
| AR51 | PAYROLL | PYR | CR | — | PCP | E |
| AR52 | PAYROLL | PCP | CR | PL | PYR | E |
| AR53 | EARNINGS | ERN | DR | — | EVP | E |
| AR54 | EARNINGS | EVP | CR | EL | ERN | E |
| AR55 | PAYMENTS | PAY | DR | — | CKP | S |
| AR56 | PAYMENTS | CKP | CR | DL | PAY | S |
| AR57 | DISBURSEMENTS | CKP | CR | DL | PAY | S |
| AR58 | DISBURSEMENTS | PAY | DR | — | CKP | S |
| AR59 | ADJUSTMENTS | PLA | DR | AL | PLA | X |
| AR60 | ADJUSTMENTS | PLA | CR | AL | PLA | X |
| AR61 | COST OF SALES | COS | DR | — | STP | C |
| AR62 | COST OF SALES | STP | CR | SL | COS | C |

In the foregoing table, the absence of a code in a code field of a control record indicates that such a code is not necessary for the purposes of the particular control record.

The recordkeeping job name stored in field AC2 of a control record also defines the accounting basis used by the system. For example, if as in control record label AR6 shown in Table II the recordkeeping job name in field AC2 is "Payments" then recordkeeping is performed on a cash basis. Conversely, if as in other sample records shown in Table II the recordkeeping job name in field AC2 is "Disbursements" or "Payables", then accounting is performed on an accrual basis. Accordingly, the correct recordkeeping jobs are defined in light of the accounting basis used by the entity whose ledger accounts are maintained by the system according to the present invention.

The preferred embodiment shown in FIG. 1 includes a file control table 34 which contains a record for each of the data files. Each file control table record includes a data file name and a pointer indicating the last record in each transaction data file which was a permanent original entry and the last account record created in each of the ledger data files. In this manner, the data files can be tracked so that unauthorized changes can be readily detected. As shown in FIG. 8, the file control table 34 stores five file records, each corresponding to one of the five data files. A record label stored in field FC1 uniquely identifies each record stored in the file control table 34. The name of the corresponding data file is stored in field FC2 and field FC3 stores a data file record number that identifies the last used record in the file named in field FC2. The file control table 34 is updated when accounting transaction data has been entered in the permanent transaction records file 30 and posted to the appropriate ledger file 22, 24, or 26. The file control table records are also updated whenever a new account record is created in either of the control general ledger file 22, the obligations due subsidiary ledger file 24, or the discretionary subsidiary ledger file 26.

Operation of the system according to the present invention is controlled by the computer program 12 which includes a number of programmed recordkeeping procedures for reading data from and writing data to the five data files in a manner consistent with the authorization codes stored in the accounting control table 32 and the record pointers stored in the file control table 34. An example of a preferred program for use in this system is presented in the microfiche appendix to this application and is incorporated herein by reference.

The data gathered by the recordkeeping job requested by the system user are written by the program into temporary transaction records that are stored in the temporary transaction records file 28 until all necessary information to satisfy a completed accountable event or condition is obtained for one or more of these records. When all such information is obtained then a balancing transaction record is created for the particular economic activities related to the transaction and the transaction and the balancing transaction record is included in the assembled, balanced transaction record set.

Operation of the system is initiated when the user inputs data, e.g., via the terminal 16 shown in FIG. 1, and requests authorization from the system to access the records in any of the five data files. If authorization is granted, then the creation of new records or the updating of existing records in the data files can proceed.

The user preferably provides the following data items when updating the data files:

1) a recordkeeping procedure name;
2) a name of a legal entity or its obligation due subsidiary ledger account number with whom or on whose behalf an activity took place;
3) an account record label from the control general ledger or the discretionary subsidiary ledger;
4) a transaction activity date;
5) a money amount;

and may provide a document identification including a type code and number. As described more fully hereinbelow, the recordkeeping procedures which are coded in the computer program utilize the data input by the user to properly create new file records and to update the data stored in existing file records.

The recordkeeping procedure named by the user selects a control record from the accounting control table 32 having a name stored in field AC2 thereof which matches the name of the recordkeeping procedure selected by the user. The recordkeeping procedure is programmed to reject any request (i.e., record creation, updating, etc.) not precisely defined in symbolic form by a single control record. For example, in order to access or create a new control general ledger record, a new obligation due subsidiary ledger record, or a new discretionary subsidiary ledger record the requested recordkeeping procedure would be programmed to select one of the control records AR10-AR32 as shown in Table II having the name of the requested recordkeeping procedure in field AC2 thereof. The program then reads the account number and/or the account name supplied by the user and compares those data with the data stored in fields GL6 or GL7, fields OL7 or OL8, and fields DL7 or DL8 of the respective ledger data files 22, 24, or 26. If no account record containing either of those data items is found, the system will create one as described below. If, on the other hand, an account record is found, the computer program compares the entity type code in field AC7 of the selected control record with the code in field OL3 of the obligation due subsidiary ledger account record. If the codes stored in the corresponding fields do not match, the system will not process the request.

To authorize a new record in either the control general ledger file 22, the obligation due subsidiary ledger file 24, or the discretionary subsidiary ledger file 26, the recordkeeping job specified by the user must have a name corresponding to a job name stored in field AC2 of the control record in the accounting control table 32, for example, one of the control records AR1-AR7 for an obligation due subsidiary ledger record or AR10-AR32 in Table II for a control ledger record or discretionary subsidiary ledger record. The control record contains a transaction posting authorization code in field AC3 or AC7 thereof, a debit/credit identifier in field AC4 and a legal entity type code in field AC7. The authorization code in the control record together with the debit/credit identifier are written into the newly created general account record and discretionary subsidiary account record together with the cross-referencing data to be stored as described above. The debit/credit identifier code and the legal entity type code are written into the newly created obligation due subsidiary ledger account record. Each new account record is assigned the next sequential record number after that presently stored in the file control index table 34 for the particular ledger file. The file control table 34 is then updated by the program to indicate in field FC3 the record number of the newly created ledger account record.

Certain ledger account records and corresponding accounting control records are required in the preferred embodiment of the system according to the present invention. The following rules apply:

1. There must be a control general ledger record for an accounts receivable ledger account when doing either cash or accrual basis accounting. There must be a control record in the accounting control table 32, for example, control record number AR12 as shown in Table II to authorize creation of the accounts receivable ledger account record.

2. There must be a control general ledger record for an accounts payable ledger account when doing accrual basis accounting. There must be a control record, such as control record number AR17, in the accounting control table of Table II to authorize creation of the accounts payable ledger account record.

3. There may be a control general ledger record of an accrued payroll ledger account when doing either cash or accrual basis accounting. There must be a control record, such as control record number AR21, as shown in Table II, to authorize creation of the accrued payroll ledger account record.

4. There must be a control general ledger record for an exchange ledger account when doing either cash or accrual basis accounting. There must be control records, such as control records AR14, AR19, AR23, and AR28, as shown in Table II, to authorize creation of the exchange ledger account records for doing receivables, payables, payroll, or disbursements recordkeeping in that ledger account.

5. There must be a control general ledger record for a profit and loss ledger account when doing either cash or accrual basis accounting, and there must be a control record, such as record number AR29 in Table II, to authorize creation of the profit and loss ledger account record.

6. There must be an obligation due record for the entity whose ledger accounts are being maintained by this system, and there must be a control record such as control record number AR7 in Table II, to authorize creation of such an obligation due account record. As an auditable accounting control, the money balance in this obligation due account must always net to zero.

To authorize creation of a new record in the temporary transaction records file 28, the recordkeeping procedure named by the user must correspond to a job name stored in field AC2 of a control record in the accounting control table 32. The named recordkeeping procedure supplies the record number of the appropriate control record storing that name, e.g., one of the control records AR40–AR62 in Table II. When an electronic or paper document, such as a check or invoice, is to be or has been generated to complete a transaction, the recordkeeping procedure supplies a record number of a control record containing a document code in field AC5 thereof, for example, control record AR41 in Table II. It will be appreciated that the system according to the present invention can include means for generating such a document, in which case the document is preferably produced after the transaction data has been entered and posted by the system. In another embodiment a document can be generated independently from the system, e.g., as handwritten or typed documents. In the latter case, the document is preferably produced before the transaction data is entered and posted by the system.

When there is no document generated in connection with the creation of a temporary transaction record, the recordkeeping procedure supplies a record label of a control record that does not contain a document code, for example, control record AR40 in Table II. The authorization code from field AC3 of the selected control record is retrieved from the control record together with the document code, if present, in field AC5 of the control record. The authorization code is written to field TT3 of the new transaction record. The document code is written into field TT10, if the control record contains one, otherwise field TT10 is left blank. The next available transaction record label is assigned to the newly created record and the file control table 34 is updated to indicate the new transaction record in the temporary transaction data file 28. Accounting data input by the user concerning the accounting transaction activity, such as the money amount, the transaction activity date, and, if a document is generated, the document code and number are also written into the new transaction (fields TT2, TT8, and TT11) record as well as the cross referencing data to the ledger data files (fields TT5, TT6, and TT7).

When creating a new temporary transaction record, the system identifies the account records in the control general ledger file 22, the obligation due subsidiary ledger file 24, and discretionary subsidiary ledger file 26, the money amount involved in the transaction, and the date on which the transaction activity occurred which are all input by the user. The proper account record or records are determined from the account code and entity name input by the user. To subsequently access a previously created temporary transaction record, the code stored in field AC3 of the selected control record must match the code stored in field TT3 of the temporary transaction record.

Before a new temporary transaction record is stored, field TT10 of the record is evaluated by the system to determine whether the system can record a balanced accounting transaction set in the permanent transaction records file 30 and make postings to the appropriate ledger records. If field TT10 contains nil data, i.e., data that is of no significance to the program, then the posting process cannot proceed. If, however, the field contains a document code then the posting process proceeds.

When the posting process is initiated the computer program reads the document code and number stored in field TT11 of the newly created or updated temporary transaction record. The program compares the data in field TT11 against that stored in the last permanent transaction record containing the same document code in PT13 and a number in field PT14. If the document numbers of the two transaction records are the same, the program does nothing further. If, however, the document numbers are different and it is the next document number in sequence, the program proceeds to assemble an accounting transaction record set by writing the document code and number of the newly created temporary transaction record into field TT11 of all temporary transaction records relating to the same legal entity input by the user. It is to be understood that at this point in the system processing, fields TT4 and TT9 of each temporary transaction record in the to-be assembled set must contain nil data. If that condition is not met processing is required to terminate.

When the posting process is allowed to continue, the computer program reads field TT3 in each of the temporary transaction records of the set and identifies the two contrasting authorization codes stored in field TT3 of the temporary transaction records in the set. There can be no more than to such codes in the set. The program then selects the two control records from the accounting control table 32 having the same two authorization codes in fields AC3 and AC6 thereof. The program compares the authorization code stored in field AC3 of the first of the two control records found with the code stored in field TT3 of each of the temporary transaction records in the set to find the transaction records with a matching authorization code. The program then applies the following rules:

a. If the money amount stored in field TT2 of a temporary transaction record with the matching authorization code is positive, then the debit/credit descriptor stored in field AC4 of the first control record is copied into field TT4 of each such temporary transaction record.

b. If the money amount in field TT2 of a temporary transaction record with the matching authorization code is negative, then the debit/credit descriptor in field AC4 of the other control record is copied into TT4 of each such temporary transaction record.

When the appropriate debit/credit descriptors have been written to each of the temporary transaction records in the set, all of the debit amounts in the temporary transaction record set are summed, as are all the credit amounts. If the debit sum and credit sum are not in balance then the posting process does not proceed. However, if the debit and credit sums are in balance, the program is then permitted to create permanent transaction records and to post data to the ledger account records for updating the account record balances and the current date is written by the program into field TT9 in each temporary transaction record of the set.

The program then evaluates the posting date in field TT9, and if it is the same date as, or subsequent to, the posting date in field PT12 of the last permanent transaction record stored in the permanent transaction records file 30, then a new permanent transaction record set is created. For each record in the temporary transaction record set, a new permanent transaction record is created in the permanent transaction records file 30. The computer program copies the data from each temporary transaction record to the corresponding data fields in a newly created permanent transaction record. For example, the data items stored in fields TT2, TT3, TT4, TT5, TT6, and TT7 of the temporary transaction record are copied to field PT2, PT3, PT4, PT5, PT6, and PT7 of the permanent transaction record. The data items in fields TT8, TT9, TT10, and TT11 of the temporary transaction record are copied into data fields PT11, PT12, PT13, and PT14 of the permanent transaction record. The program then determines the record labels of the permanent transaction records which were last used to update the account record identified in fields PT5, PT6, and PT7 respectively. The program then writes the permanent transaction record labels to those permanent transaction records into fields PT8, PT9, and PT10 of the newly created permanent transaction record. The foregoing process is repeated for each new permanent transaction record created from a temporary transaction record in the set.

The file control table 34 is updated by the program when the last temporary transaction record of the set has been written to the permanent transaction records file 30. To that end the program reads the permanent transaction record pointer in field FC3 of the file control record for the permanent transaction record file and writes the next available label into field PT1 of the newly created permanent transaction record. For example, if the record pointer in FC3 is an integer (N), the "next available" record label would be that integer plus one (N+1). The program then updates the record pointer in field FC3 of the file control record for the permanent transaction record file 30.

After the temporary transaction record set is entered into the permanent transaction records file 30, the temporary transaction records in the physical storage spaces previously occupied by the set in the temporary transaction records file 28 are erased and the file control table 34 is updated to make the record labels for those records available for assembling a new temporary transaction record set.

When the permanent transaction record set has been completed, the program proceeds to update the money balances in each of the ledger account records identified in fields PT5, PT6, and PT7 of the permanent transaction records. The record pointers stored in fields PT5, PT6, and PT7 of a new permanent transaction record are read by the program which uses them to select the corresponding control general ledger account record that is to be updated. The balances are updated as follows.

The symbolic posting authorization code stored in field PT3 of a permanent transaction record is compared with the symbolic posting authorization code in field GL3 of the corresponding control general ledger account record. If the codes match then the value of the money amount stored in field PT2 of the permanent transaction record is added to the money balance in the account record.

If the posting authorization codes do not match, then the value of the money amount stored in field PT2 of the permanent transaction record is subtracted from the money balance in the control general ledger account record. The balances in the obligation due subsidiary ledger account records and in the discretionary subsidiary ledger account records belonging to the updated control general ledger account record are posted in the same way as that in the control general ledger account record.

When all of the balances in the respective ledger account records identified in the permanent transaction records have been updated, the program writes the permanent transaction record label stored in field PT1 of the updating permanent transaction record into fields GL5, OL5, and DL5 in the respective ledger account records. The permanent transaction record pointer stored in field GL5, OL5, or DL5 identifies the permanent transaction record whose money amount in field PT2 was last used to update the money balances in the respective ledger accounts, thereby providing a cross-reference to the permanent transaction records file 30. The updating and posting process is repeated for each of the remaining newly created permanent transaction records.

When the updating and posting process has been completed, trial balances can be abstracted from account balance reports 34 as printouts or other displays of the ledger account records stored in the control general ledger file 22, the obligation due subsidiary ledger file 24, or the discretionary subsidiary ledger file 26.

It is apparent from the foregoing description and drawings that the system according to the present invention is a novel and improved system for maintaining the ledger accounts of a recordkeeping entity. The system automatically balances debits and credits whenever accounting data concerning completed transactions are input to the system. The system according to this invention provides up-to-the-minute information on the status of all of the ledger accounts of the recordkeeping entity whose books are maintained by the system. Trial balances can be extracted substantially contemporaneously with the posting of an accountable transaction.

The unique arrangement of data files and control files provides great flexibility such that the system can be employed by any size enterprise by simply expanding or reducing the physical size of the files to accommodate more or less records. Moreover, the system provides complete traceability so that unauthorized changes to the accounting records stored in the system's data files are readily detectable by automated processes. Thus, the system provides a higher level of security than known computer implemented accounting systems.

Although the system according to this invention has been described for use in the context of money control, the system is readily adaptable for the ongoing management and control of the inventories of a recordkeeping entity, as well as other, accountable processes which use ledgers. Thus, it will be recognized by those skilled in the art that changes or modifications may be made to the above-described invention without departing from the broad inventive concepts of the invention. It is understood, therefore, that the invention is not limited to the particular embodiment disclosed herein, but is intended to cover all modifications and changes which are within the scope of the invention as defined in the appended claims.

What is claimed is:

1. In a system for maintaining the ledger accounts of a recordkeeping entity, said system including input means for receiving transaction data relating to an accountable transaction affecting at least one of the ledger accounts and output means providing indicia of the money balance in each of said ledger accounts;

a subsystem for recording the data and updating the ledger account balances comprising:

a. control code file means storing a plurality of accounting control records, each control record containing a recordkeeping procedure name, a first symbolic code for controlling the creation and updating of a data file record, a second symbolic code for qualifying a money amount as a debit or credit, and a third symbolic code indicative of a document generated in connection with the accountable transaction;

b. data file means including:
  i. ledger account data file means for storing an account record corresponding to one of the ledger accounts, said account record including a money balance, the first symbolic code from a selected one of said accounting control records and the second symbolic code from said selected accounting control record, for qualifying said money balance; and
  ii. transaction data file means for storing a transaction record relating to the accountable transaction, said transaction record including the first symbolic code from said selected accounting control record, a money amount, the second symbolic code from said selected accounting control records, for qualifying said money amount, and the third symbolic code from said selected accounting control record;

transaction data recording means for transferring the transaction data including a money amount from the input means and the first, second, and third symbolic codes from the selected accounting control record to a selected transaction record in the transaction data file means; and ledger account record posting means responsive to the third symbolic code for posting the money amount from the selected transaction record to the account record for the ledger account affected by the accountable transaction.

2. A system as recited in claim 1 wherein said transaction data file means comprises:

temporary transaction data file means for temporarily storing transferred but unposted transaction data in a temporary transaction record; and permanent transaction data file means responsive to the third symbolic code for storing said transaction data in a permanent transaction record when a document is generated in connection with the accountable transaction and the third symbolic code corresponding to the document is present in said temporary transaction record.

3. A system as recited in claim 2 further comprising file control index means for storing indicia identifying the last record stored in said ledger account data file means and in said transaction data file means.

4. A system as recited in claim 3 wherein said file control index means comprises:

temporary transaction record index means for storing first indicia identifying the last-used temporary transaction record; and permanent transaction record index means for storing second indicia identifying the last-used permanent transaction record.

5. A system as recited in claim 4 wherein said transaction data file means comprises:

transaction record assembly means for composing a set of temporary transaction records including all temporary transaction records corresponding to the accountable transaction;

transaction record balancing means for determining whether the debit money amounts and the credit money amounts stored in the temporary transaction records constituting said temporary transaction record set are in balance; and data entering means responsive to said transaction record balancing means for entering the transaction data from the temporary transaction records constituting said temporary transaction record set into a set of permanent transaction records when said temporary transaction record set is balanced.

6. A system as recited in claim 1 wherein said ledger account data file means comprises:

control-general-ledger data file means for storing an active account record corresponding to an active one of the ledger accounts;

first subsidiary ledger data file means for storing an obligation account record corresponding to an entity who owes or to whom is owed money; and second subsidiary ledger data file means for storing a discretionary account record corresponding to said active account record.

7. A system as recited in claim 6 wherein said control code file means stores a fourth symbolic code for controlling the creation and updating of said first subsidiary ledger data file means; and the account record in said first subsidiary ledger data file means includes said fourth symbolic code from a selected one of said accounting control records.

8. A system as recited in claim 6 wherein said ledger account record posting means comprises:

account record identifying means for identifying the active account record and the corresponding obligation account record and discretionary account record to be updated from a transaction record;

for matching one of the first or second symbolic codes stored in the active account record, obligation account record and discretionary account record identified by the account record identifying means with one of the first or second symbolic codes stored in the transaction record; and updating means for increasing or decreasing the money balance in said active account record, obligation account record, and discretionary account record by the money amount in the transaction record having a matching symbolic code;

whereby the money balance in an active account record, and any corresponding obligation account record or discretionary account record is updated by the correct amount.

9. A system for providing a balance in a defined ledger account, said system comprising:

control code file means storing a plurality of accounting control records, each control record containing a recordkeeping procedure name; a symbolic authorization code for authorizing the creation of transaction and account records, and for controlling the updating of said account records; a debit/credit descriptor code for characterizing an account record as a debit account or a credit account and for characterizing a money amount as a debit amount or a credit amount; and a document code indicative of a document that has been generated in connection with an accountable transaction;

ledger account data file means for storing an account record corresponding to one of the ledger accounts, said account record including a money balance, the debit/credit descriptor code for said money balance and the authorization code that authorized the creation of said account record;

transaction data file means for storing a transaction record relating to the accountable transaction affecting at least one of the ledger accounts, said transaction record including a money amount, the debit/credit descriptor code characterizing said money amount, and the authorization code controlling the updating of the account record to be updated by said transaction record;

file control index means for storing indicia identifying the last-used transaction record in said transaction data file means;

transaction data input means for receiving transaction data relating to the accountable transaction, said transaction data including a ledger account identifier, a money amount, and a transaction date;

transaction data recording means for transferring the transaction data from said transaction data input means together with the authorization code, the debit/credit descriptor code, and the document code from a selected control record in said control code file means to a selected transaction record in the transaction data file means; and ledger account record posting means responsive to the document code for posting the money amount stored in the selected transaction record to the account record for the ledger account affected by the accountable transaction and identified by said ledger account identifier.

10. A system as recited in claim 9 further comprising output means for providing indicia of the money balance in the account record, whereby an account balance report can be obtained substantially contemporaneously with the entry of the transaction data.

11. A system as recited in claim 9 wherein said transaction data file means comprises:
temporary transaction data file means for temporarily the storing transaction data in a temporary transaction record; and
permanent transaction data file means responsive to the document code for storing said transaction data in a permanent transaction record when the document is generated in connection with the accountable transaction.

12. A system as recited in claim 11 wherein said file control index means comprises:
temporary transaction record index means for storing first indicia identifying the last-used temporary transaction record; and
permanent transaction record index means for storing second indicia identifying the last-used permanent transaction record.

13. A system as recited in claim 12 wherein said permanent transaction data file means comprises:
transaction record assembly means for composing a temporary transaction record set including all temporary transaction records corresponding to the accountable transaction;
transaction record balancing means for determining whether the debit money amounts and the credit money amounts stored in the temporary transaction records constituting said temporary transaction record set are in balance; and
transaction data entering means responsive to said transaction record balancing means for copying the transaction data from the temporary transaction records constituting said temporary transaction record set into a permanent transaction record set when the temporary transaction record set is balanced.

14. A system as recited in claim 9 wherein said ledger account data file means comprises:
control-general-ledger data file means for storing an active account record corresponding to an active one of the predefined financial accounts;
first subsidiary ledger data file means for storing an obligation account record corresponding to an entity who owes or to whom is owed money; and
second subsidiary ledger data file means for storing a discretionary account record corresponding to said active account record.

15. A system as recited in claim 14 wherein said control code file means stores an entity type code for controlling the creation and updating of said first subsidiary ledger data file means; and the account record in said first subsidiary ledger data file means includes said entity type code from a selected one of said accounting control records.

16. A system as recited in claim 14 wherein said transaction data recording means comprises control record selection means responsive to a recordkeeping job name provided with the transaction data for selecting the control record.

17. A system as recited in claim 16 wherein said ledger account record posting means comprises:
account record identifying means for identifying the active account record and the corresponding obligation account record and discretionary account record to be updated from a transaction record;
debit/credit descriptor code matching means for matching the debit/credit descriptor code stored in the active account record, obligation account record, or discretionary account record identified by the account record identifying means with the debit/credit descriptor code in the transaction record; and
updating means for increasing or decreasing the money balance in said active account record, obligation account record, or discretionary account record by the money amount in the transaction record with a matching debit/credit descriptor code;
whereby the money balance in an active account record, and any corresponding obligation account record or discretionary account record is updated by the correct money amount.

* * * * *